Figure 1:
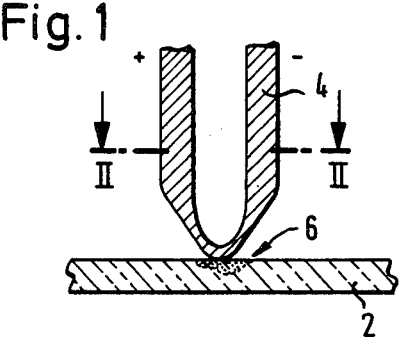

United States Patent [19]

Perkut

[11] 4,127,017

[45] Nov. 28, 1978

[54] METHOD OF PRODUCING MAGNETIC BODIES AND THE USE THEREOF IN MAGNETIC LOCKS

[75] Inventor: Branko R. Perkut, Hamburg, Fed. Rep. of Germany

[73] Assignee: MRT Magnet-Regeltechnik G.m.b.H., Hamburg, Fed. Rep. of Germany

[21] Appl. No.: 750,916

[22] Filed: Dec. 15, 1976

[30] Foreign Application Priority Data

Dec. 23, 1975 [DE] Fed. Rep. of Germany ....... 2558159
Dec. 30, 1975 [DE] Fed. Rep. of Germany ....... 2559203

[51] Int. Cl.² ............................................ E05B 47/00
[52] U.S. Cl. ........................................ 70/276; 70/413
[58] Field of Search ................... 70/413, 276; 335/296

[56] References Cited

U.S. PATENT DOCUMENTS

| 2,914,746 | 11/1959 | James ................................ 70/413 X |
| 2,931,953 | 4/1960 | Barney .............................. 70/413 X |
| 2,959,832 | 11/1960 | Baermann ......................... 335/303 X |
| 3,602,020 | 8/1971 | Kajita ................................ 70/413 X |
| 3,611,763 | 10/1971 | Sedley ................................ 70/413 |
| 3,855,827 | 12/1974 | Hallman et al. .................. 70/413 X |

FOREIGN PATENT DOCUMENTS

| 2,403,169 | 7/1975 | Fed. Rep. of Germany ............ 70/413 |
| 2,423,573 | 11/1975 | Fed. Rep. of Germany ............ 70/276 |
| 2,513,500 | 10/1976 | Fed. Rep. of Germany ............ 70/276 |
| 2,539,757 | 3/1977 | Fed. Rep. of Germany ............ 70/413 |

OTHER PUBLICATIONS

"Koroseal Flexible Magnetic Strip", 1/66, IPC-10-61-1062, pp. 1-8, B. F. Goodrich Industrial Products company.

Primary Examiner—Rodney H. Bonck
Attorney, Agent, or Firm—Beaman & Beaman

[57] ABSTRACT

The invention pertains to magnetically operated locks, and particularly pertains to a magnetic lock using a code device having a low magnetic permeability wherein a small localized portion of the code device surface is magnetized to produce dipoles located at a common surface, the localized magnetized region functioning to position magnetic elements of a lock.

4 Claims, 9 Drawing Figures

METHOD OF PRODUCING MAGNETIC BODIES AND THE USE THEREOF IN MAGNETIC LOCKS

In the production of locally limited magnetized zones, for example for coding purposes in input/output media, magnetic keys, magnetic indentification devices and the like, it is difficult to obtain a high information package density. Furthermore it is difficult to produce locally limited magnetized zones which can give rise to the application of relatively large magnetic forces.

The invention emanates from the task of creating magnetic bodies with locally limited magnetized zones with which a high information package density is possible and which can be produced in a simple manner. A further essential task of the invention is to provide a simple process for producing such magnetic bodies. This process and magnetic bodies produced thereby may be used to provide magnetically actuable control devices, especially locks.

According to the invention in one aspect, there is provided a process for the production of locally limited magnetized zones in bodies consisting of magnetic material by means of a magnetizing current in an electric conductor of which a loop is bent with a small radius into a hairpin-shape and placed with its tip abutting the surface of the body at the place to be magnetized substantially at a right-angle thereto whereby the magnetizing current induces a magnetic dipole with a very small pole separation in a layer of the body near to the surface thereof.

The magnetic material is preferably of low permeability and may be an oxide ceramic such as barium ferrite. The hairpin-shaped loop is preferably disposed substantially at a right-angle to the surface of the body.

The above process according to the invention enables pairs of poles to be obtained with the two narrowly spaced, locally limited poles closely adjacent to each other, thus forming genuine magnetic dipoles, which lie parallel to the surface of the body in a region close to the surface, corresponding to the applied right-angled arrangement of the magnetization loop and the width of the dipole is less than the distance between the poles. The sharply defined dipolar character has the result that the magnetic forces emanating from the individual dipolar magnetized zones are much stronger in the immediate vicinity of the dipoles than they would have been in the immediate vicinity of an individual magnetic pole which is associated with a pole which is weakened by dispersal over a greater area. However, the forces rapidly fall off with increasing distance so that there is no interference with relatively closely situated dipoles. By means of the process according to the invention, spatially sharply localised powerful magnetized zones can be provided with a relatively high packing density in a homogeneous magnetic body, with the further important advantage that each of these magnetized zones has a sharply defined orientation which can also be exploited for coding purposes.

According to the invention in another aspect, there is provided a magnetic body, having locally limited magnetized zones in the form of short magnetic dipoles lying close to and essentially parallel to the surface of the body, the distance between the poles of each dipole being less than 2 mm and the width of the dipole is less than the pole separation.

Such a magnetic body can be particularly advantageously used as a coded medium, for example as the permanent magnet of a permanent-magnet key for a magnetically actuable control device, especially a lock which can be operated by a permanent magnet, with at least one tumbler which is movable by magnetic force exerted by the permanent-magnet key from a non-operational position to an operational position for carrying out a control function.

This enables an essentially higher accuracy of adjustment to be obtained with the tumblers controlled by such a key whereby reliability of operation, in particular, is increased. In the case of some types of lock, a dipolar mgnetization is the only readily attainable acceptable way of coding the permanent-magnet key.

Dipolar magnetization is particularly applicable to two different types of locks. In one of these, the tumbler is formed as a point or line-contacting, preferably ball-shaped, tumbler which is freely displaceable in a chamber between a non-operational position in which it blocks in movement of a ward and an operational position in which it lies in a position aligned with a recess located in said chamber so that the tumbler no longer blocks movement of the ward.

According to a preferred feature of the invention, the chamber of such a lock contains at least two tumblers which are retained in their operational position, in which they lie directly alongside each other in a predetermined location and in a predetermined orientation, by a corresponding magnetic dipole formed in the key. This design has the advantage as compared with conventional locks, in which only one tumbler can be arranged in a chamber, that the number of possible permutations is increased, since not only the location of the local magnetization but also its direction is used for coding. A further advantage is that, the use of two tumblers instead of only one reduces the maximum pressure at the point of contact with the adjacent seating surface. As the adjacent seating surface is generally the relatively thin dividing wall bounding the key channel, the reduction of point-of-contact pressure is of considerable practical significance.

Dipolar magnetization is also applicable to locks in which the tumbler is formed as a rotor, which is pivotable about an axis and is furnished with a coded permanent magnet having local magnetization corresponding to the permanent magnet of the key, which rotor blocks movement of a ward when in a predetermined orientation and releases it in its other orientations. According to a preferred feature of the invention, the magnetic coding of the permanent magnet of the rotor comprises either a dipolar magnetization corresponding to that of the key or a diametrical magnetization in which the entire permanent magnet is divided into two opposingly polarised magnetic zones. It is also possible to magnetize the permanent magnet of the rotor either diametrically in the conventional manner (wherein the dividing line between both polar zones can be arranged centrally or off-centre) or to supply with a plurality of local magnetic zones, similar to those of the permanent-magnet key. In each case an accuracy of adjustment of the rotor is provided by the dipolar magnetization of the key which is far superior to that of conventional locks. In such locks, several tumblers are usually provided, which involves the provision of several chambers containing the tumblers and several rotors. In this case, in accordance with a further preferred feature of the invention, the permanentmagnet key is provided with a permanent magnetic strip in which a plurality of magnetic dipoles are formed for the actuation of all the tumblers of the lock, the strip extending through the entire thickness of the key. The permanent magnetic strip may have dipoles on both sides thereof. With this arrangement it is not necessary, as it is in the majority of convention locks actuable by permanent magnets, to allocate to each tumbler a separated permanent magnet in the key. Instead, it is possible to provide the different local magnetized zones in a single permanent magnet strip.

From the above it should be clear that the principle according to the invention is not restricted to any one particular embodiment of a lock which can be actuated by a permanent magnet. The principle according to the invention finds application in rotating cylinder locks in which a cylinder core can be rotated in a lock cylinder, as well as in so-called pressure cylinder locks in which a cylinder core can be axially displaced in a lock cylinder.

Figure 2:
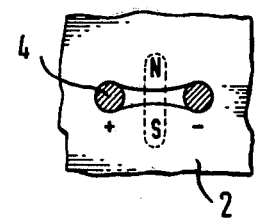
Figure 3:
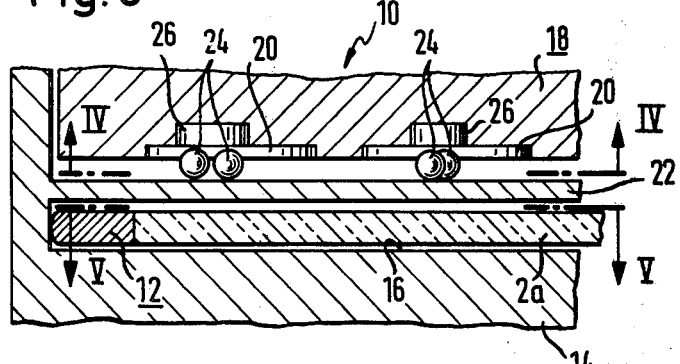
Figure 4:
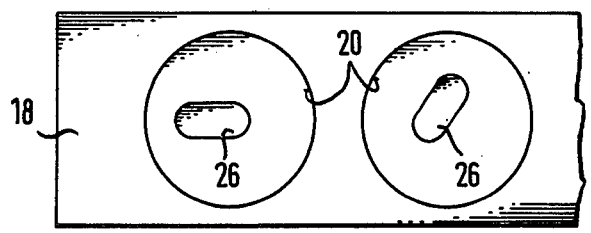
Figure 6:
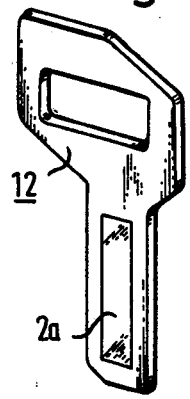
Figure 5:
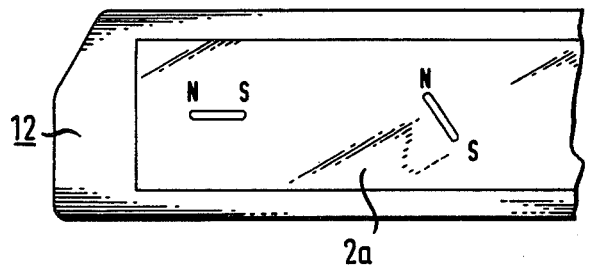
Figure 7:
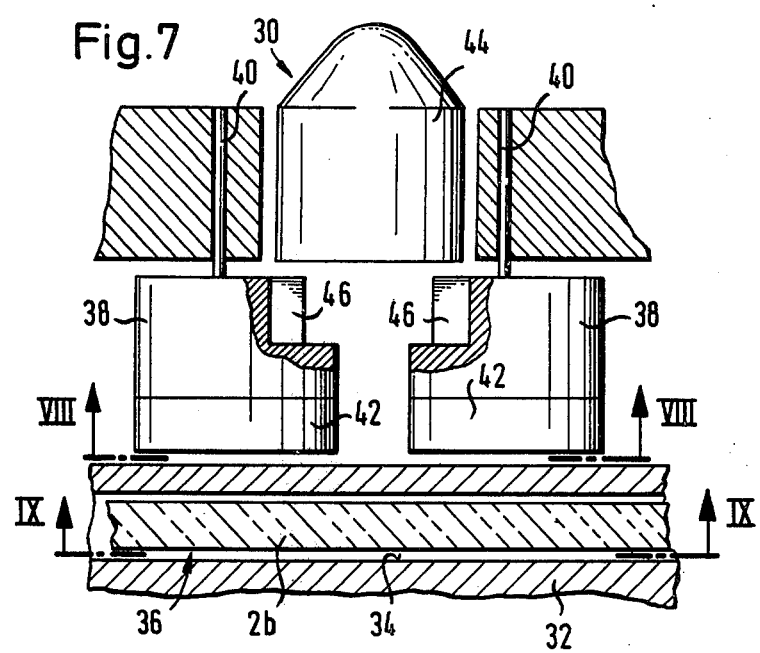
Figure 8:
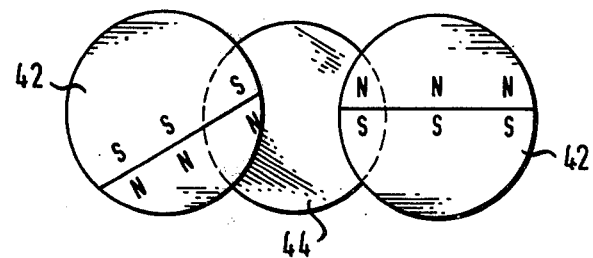
Figure 9:
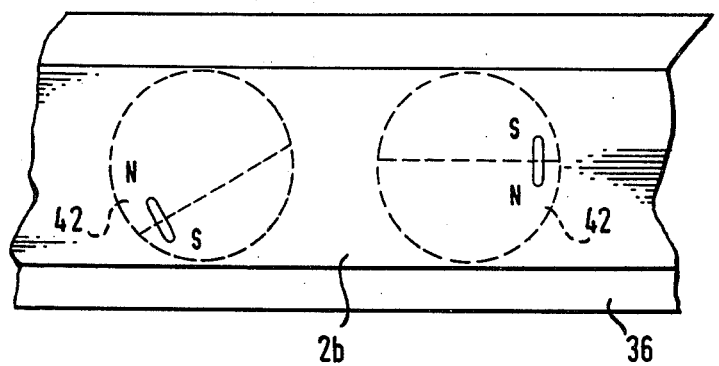

Preferred embodiments of the invention will now be described by way of example, with reference to the accompanying drawings, in which:

FIG. 1 is a schematic cross-sectional view of a device for effecting dipolar magnetization in accordance with the invention, FIG. 2 is a schematic cross-sectional view taken on the line II—II in FIG. 1, FIG. 3 is a schematic cross-sectional view through a part of a lock which can be actuated by a permanet-magnet key, with the key inserted, FIG. 4 is a fragmentary cross-sectional view taken on the line IV—IV in FIG. 3, FIG. 5 is a fragmentary cross-sectional view taken on the line V—V in FIG. 3, showing part of the key, FIG. 6 is a perspective view of the key shown in FIG. 5, on a reduced scale, FIG. 7 is a schematic cross-sectional view through a part of another lock which can be actuated by a permanent magnet, with the key inserted, FIG. 8 is a fragmentary cross-sectional view taken on the line VIII—VIII in FIG. 7, FIG. 9 is a fragmentary cross-sectional view taken on the line IX—IX in FIG. 7, showing part of the key.

FIGS. 1 and 2 show, as an illustration of the dipolar magnetization process, a plate-like magnetic body 2, which may consist of oxide ceramic, on which is placed a loop of a conductor 4, bent with a small radius into a hairpin-shape, with its point at a desired location to be magnetized 6. A magnetizing current of the polarity indicated in FIG. 1 produces a sharply localised magnetic dipole close to the surface, whose south pole lies aove the plane of the drawing and whose north pole lies below it and the dipole width is less than the separation of the poles, as will be appreciated from FIGS. 2 and 5. The magnetic body 2 may have a thickness of 2.5 mm. The conductor loop consists of copper or silver wire with a circular cross-section of 2.5 mm$^2$, the distance between the arms of the conductor loop being about 0.5 mm. With this arrangement the magnetizing current can be a maximum of about $10^4$A and be delivered from a 750W-second condensor discharge. With the above-mentioned thickness of the magnetic body 2 of 2.5 mm, the underside can also have dipolar magnetized zones applied thereto without any interference between the two zones of magnetization which are in proximity with the respective surfaces of the magnetic body 2. FIGS. 3 and 4 show schematically part of a lock 10 which can be actuated by a permanent-magnet key 12. A magnetic body 2a, magnetized as described above, is used as the permanent magnet for the permanent-magnet key 12 as illustrated in FIGS. 5 and 6.

As shown in FIG. 3 the permanent-magnet-actuable lock 10 has a lock body 14, which may be a cylinder core of a rotating or pressure-cylinder lock, provided with a key channel 16 for reception of the permanent-magnet key 12.

A ward 18 is displaceably arranged in the lock body 14. The ward 18 is provided with circular recesses 20 on its underside which form, together with the opposite wall 22 of the lock body 14, chambers for the acceptance of tumblers 24 which are spherical and formed from magnetic material. Two such tumblers 24 are arranged in each chamber 20. The chambers 20 contain respective recesses 26 into which the two corresponding tumblers 24 can enter.

Thus, if the tumblers 24 lie in a position aligned with the recesses 26, the ward 18 can be displaced downwards, as viewed in FIG. 3, when in their other positions, the tumblers 24 prevent downward movement of the ward 18. The ward 18 is used to perform a control function, e.g. a blocking function, the details of which do not form part of the invention and, for reasons of simplicity, are not shown in the drawings.

As shown in FIG. 5, the magnetic body 2a of the permanent-magnet key 12 consists of a magnetic strip which extends through the thickness of the key and on which all the dipolar magnetized zones N-S for the tumblers 24 are impressed. Although dipoles are shown in FIG. 5 for the purpose of illustration, it should be understood that in reality the dipoles are not visible to the eye. As has been found in practice, two spherical tumblers 24 of the kind illustrated are very precisely positioned by such a dipole, the relative orientation of the two tumblers 24 being determined by the axis of the dipole. As can be particularly seen from FIGS. 4 and 5, not only the location but also the orientation of each dipole contributes to the coding, with the result that the number of possible permutations is considerably greater than with an arrangement wherein only a tumbler is associated with each local magnetized zone. As the dipoles, on the one hand, produce a relatively large, strictly localised magnetic field and, on the other hand, there is no reciprocal influence on the dipoles, the tumblers 24 are moved from any random position with absolute certainty and precision into their operational position by the inserted permanent-magnet key 12. A further advantage of the employment of two tumblers is that on force being applied, the pressure transferred by the tumblers 24 on to the wall 22 at the point of contact is halved.

FIGS. 7 to 9 show schematically part of another lock 30 which can be actuated by a permanent-magnet key. The tumblers are formed not as balls but as pivotally mounted rotors. Once again, the lock can be a rotating cylinder lock or a pressure cylinder lock.

The lock 30 has a lock body 32 which once again is provided with a key channel 34 for reception of a permanent-magnet key 36. As shown in FIG. 9, the permanent-magnet key 36 is provided with a magnetic body in the shape of a magnetic strip 2b which is supplied with dipolar magnetized zones as described above.

Adjacent to the key channel 34, are located two rotors 38 which can be pivoted about axes 40 and which are each provided with a respective cylindrical disc-like permanent magnet 42. The rotors 38 are provided with recesses 46 into which a ward 44, formed as a displaceable member, can enter if the rotors 38 assume a predetermined orientation. If the rotors 38 assume the orientation shown in FIGS. 7 and 8, the ward 44 can be displaced downwards, as viewed in FIG. 7, while the rotors 38 prevent such displacement of the ward 44 when in any other orientation. The ward 44 can be so arranged that, when it is in its upper position as viewed in FIG. 7, it blocks the movement of a lock component while allowing such a movement when in its lower position. Constructural details which are necessary for the carrying out of such a controlling function by the ward 44 have been omitted for the sake of simplicity.

As indicated in FIG. 8 by continuous lines and in FIG. 9 by dotted lines, the permanent magnets 42 of the rotors 38 are provided with diametrically oriented magnetization in which the cylindrical disc-shaped magnets are divided into two zones of opposite polarity. In conventional locks of this kind the permanent-magnet key was also provided with diametrically magnetized individual permanent magnets in the same manner. In contrast to this and in accordance with the present invention, the permanent-magnet key 36 is once again provided with a magnetic strip 2b extending through the thickness of the key in which distinct local dipoles N-S are formed for the positioning of the rotors. As has been found in practice, the rotors 38 are very much more precisely positioned by the dipoles in the permanent-magnet key than by the use of conventional individual key magnets. This could be due to the fact that the dipoles exert a relatively large, locally concentrated, magnetic force which can be arranged to act at a relatively large radius from the axes 40 of the rotors 38 thus producing a relatively high rotational moment.

As illustrated in the drawings, the permanent magnets 42 of the rotors 38 are laterally magnetized, the dividing line between the two polar areas arranged either centrally as shown on the right side in FIG. 8 or offcentre as shown on the left side in FIG. 8. As an alternative to the illustrated embodiment, the permanent magnets of the rotors can have a plurality of dipolar magnetic zones instead of the above-described lateral magnetization. In this case also, a very high accuracy of adjustment of the rotors is obtained.

I claim:

1. A magnetic code device comprising, in combination, a magnetic body formed of a magnetic material having a low magnetic permeability comprising a thin member having a thickness defined by oppositely related parallel flat first and second surfaces, at least one localized magnetic zone defined at said first surface, said zone being defined by the material of said body by a magnetic dipole substantially parallel to and at said first surface whereby both poles of said dipole are located at said first surface, a dipole defined at said first surface having a depth into said body less than the thickness of said body, the distance between the poles of said dipole being less than 2mm, and the width of said dipole is less than the distance between the poles of said dipole.

2. In a magnetic code device as in claim 1 wherein a plurality of dipoles are defined on said body.

3. In a magnetic code device as in claim 1, a rotary member rotatably about an axis perpendicular to said first surface, said member having a sensing surface disposed adjacent said body first surface, and a magnetic area defined on said sensing surface by a dipole region defining a straight line between the opposite poles of said area region.

4. In a magnetic code device as in claim 1, a lock member adapted to receive said magnetic body, said lock member including a movable ward having an elongated chamber defined therein, and a pair of magnetic spherical tumblers movably positionable in side by side relationship within said chamber inder the influence of said magnetic zone for controlling operation of said ward.

* * * * *